July 24, 1951  W. C. PERROW  2,561,884
PIPE JOINT
Filed June 19, 1946

Inventor:
WARREN C. PERROW
By Martha Conway
Attorney

Patented July 24, 1951

2,561,884

UNITED STATES PATENT OFFICE 2,561,884

PIPE JOINT

Warren C. Perrow, Richmond, Va.

Application June 19, 1946, Serial No. 677,784

2 Claims. (Cl. 285—163)

This invention relates to pipe joints, and more particularly to joints of the bell and spigot type used in pipe lines carrying liquids which are either free flowing or under low pressure, as, for example, sewers.

The general object of the invention is to provide an efficient and practical joint of this type which prevents or minimizes leakage of liquids from or infiltration of liquids into such pipe lines, and which will effectively exclude roots and/or sand.

To this end, I have devised a novel one piece, annular, preformed, elastic gasket, to be used in place of the gaskets commonly employed heretofore, and made of braided or twisted fibrous material.

In order that the invention may be readily understood, reference is had to the accompanying drawing, forming part of this specification, and in which.

Figure 1:
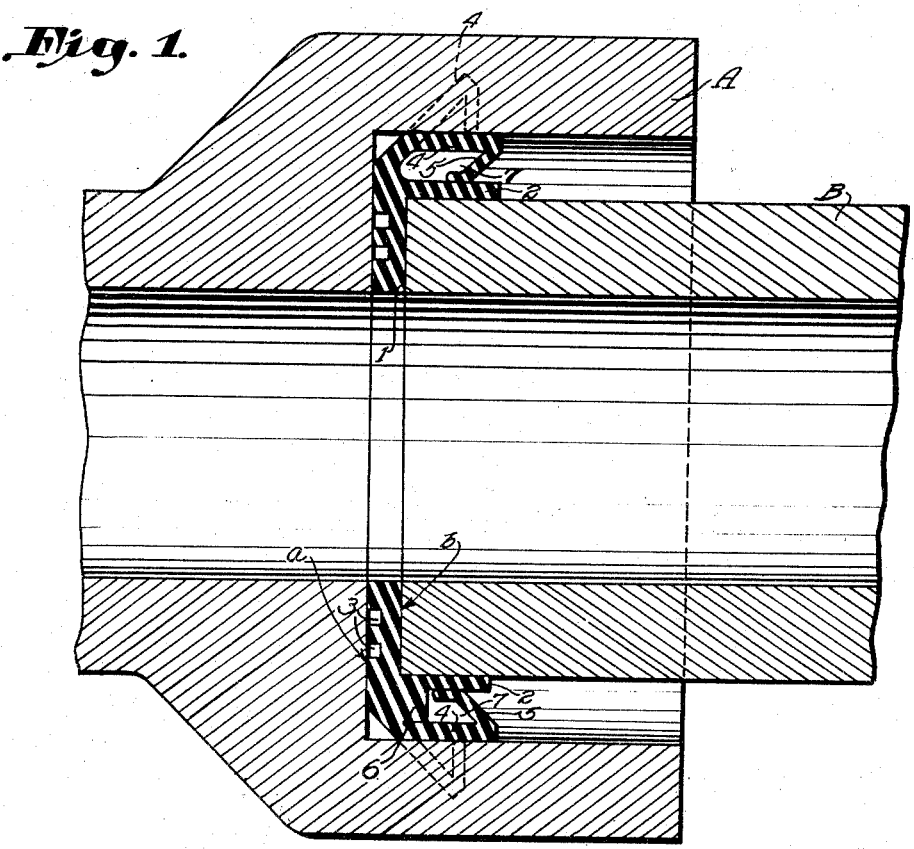
Fig. 1 is a longitudinal section through a bell and spigot joint, with my improved gasket in position, showing the parts as they appear when assembled.

Referring to the drawing in detail, there is illustrated in Fig. 1 a pipe joint comprising a bell A and spigot B, with my improved gasket inserted between them.

This gasket consists of an annular body of natural or synthetic rubber, or other suitable elastic material, such body comprising a radially disposed inwardly directed flange 1.

The gasket also comprises an axially extending flange 2 having an internal diameter adapted to snugly embrace the end of the spigot B as shown in Fig. 1.

Figure 3:
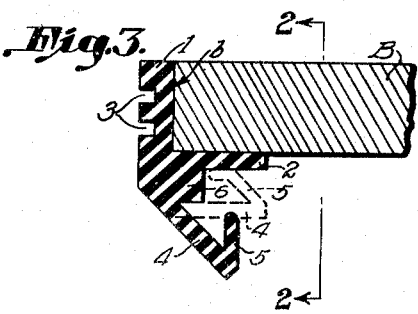
Fig. 3 is a fragmentary longitudinal section taken substantially on the line 3—3 of Fig. 2, looking in the direction of the arrows.

A third flange 4 is disposed at an angle to the flange 2 and flares outwardly therefrom, as shown in dotted lines in Fig. 1 and in full lines in Fig. 3.

Thus this part of the gasket is of generally V-shape in cross-section, the flanges 2 and 4 constituting the two legs of the V.

The outwardly flaring leg 4 is formed at its free edge with an inwardly directed annular radially compressible lip or member 5, shown in dotted lines in Fig. 1, and in full lines in Fig. 3.

Formed in the outer face of the radial flange 1 are one or more annular grooves 3, two such grooves being shown.

Figure 2:
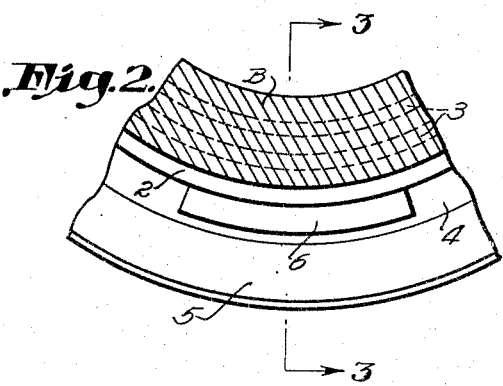
Fig. 2 is a fragmentary rear elevation of a portion of my improved gasket as it appears when applied to the end of the spigot, and before being inserted into the bell, a portion of the spigot being shown in section substantially on the line 2—2, of Fig. 3.

In some cases it is desirable to reinforce the gasket at the side which will be applied to the lower side of the joint by providing a thickened portion 6 adjacent the apex of the V, as shown in Fig. 3. This thickened portion 6 is of arcuate form, as shown in Fig. 2, and may extend around any desired fraction of the circumference of the gasket.

The method of using my improved gasket is as follows: The flange 2 is first fitted snugly over the end of the spigot. The grip of the flange 2, due to its elasticity, may be increased, if desired, by applying a cementing material between the flange and the surface of the spigot. The inner surface or wall of the bell may be similarly coated with cementing material.

The spigot, carrying the gasket with its leg 4 flaring outwardly and rearwardly as shown in dotted lines in Fig. 1, is then inserted in the bell, and this results in such outwardly flaring leg being deformed or compressed, and forced inwardly, into the position shown in full lines in Fig. 1, and in dotted lines in Fig. 3. When thus forced inwardly, the outer leg 4, tightly engaging the inside of the bell, is brought into a position substantially parallel with but spaced from the inner leg 2. Because of the flexibility of the material, this outer leg will closely contact the inner surface of the bell, notwithstanding the fact that, due to warping in curing or burning, the outer surface of the pipe and inner surface of the bell may not be true concentric circles.

At the same time, the lip or annular member 5 is pressed inwardly until its free edge engages and abuts the outer periphery or cylindrical surface of the inner leg 2, as shown in full lines in Fig. 1.

The purpose of this lip 5 is two-fold: First, it serves to support and hold the edge of the outer leg firmly against the inner wall of the bell, and second, it provides a cover which encloses the annular space 7 between the two legs of the gasket and serves to retain in this space any filling material which it may be desired to use to assist in maintaining tight contact between the outer leg and the wall of the bell.

The compressible radial flange 1, when the parts are assembled in final position, is interposed between and in contact with the bottom wall *a* of the bell, and the end wall *b* of the spigot, to assist in forming a tight joint, and to permit slight movement of the pipe sections due to expansion or settling. The purpose of the grooves 3 is to break up the capillary path which might otherwise be formed between the bottom wall of the bell and face of the flange, and thus prevent leakage over such path. If desired, the groove or grooves may contain rings of dry cork, or a similar compressible material, that will further assist in maintaining a tight joint by virtue of its expanding in the presence of moisture. The inside diameter of the flange 1 is, of course, the same as that of the pipe, so as to present an unbroken inner surface for free flow of the liquid.

With the form of gasket shown, the annular space between the gasket and end of the bell may be filled with mortar or suitable pipe joint compositions. However, by making the legs 2 and 4 longer, and, if necessary, modifying the original angle between them, the gasket can be so constructed as to itself substantially fill the space in the bell, obviating the necessity for additional jointing material.

What I claim is:

1. In a pipe joint comprising inner and outer pipe members of the bell and spigot type defining between them an annular space, a gasket of elastic material for sealing said annular space, said gasket comprising a body of generally V-shape, having two legs with free edges, and being formed with an annular flange adapted to be interposed between the end of the spigot and the bottom of the bell, one of said legs extending axially and constructed to snugly embrace the end of the spigot, and the other leg being disposed at an angle to the first, and normally flaring outwardly therefrom, said outwardly flaring leg having a maximum diameter substantially greater than the diameter of the inner surface of the bell, and being adapted to engage and lie in close contact with the wall of the bell when inserted therein and to be thereby deformed, and forced inwardly into a position approximately parallel with but spaced a substantial distance from said first leg, and said outwardly flaring leg having at its free edge an inwardly projecting compressible lip disposed at an acute angle thereto and normally lying in a plane substantially parallel with said annular flange, said lip being unattached to but constructed to abut directly against the outer periphery of said axially extending first leg when said outwardly flaring leg is forced inwardly by engagement with the wall of the bell.

2. In a pipe joint comprising inner and outer pipe members of the bell and spigot type defining between them an annular space, a gasket of elastic material for sealing said annular space, said gasket comprising a body of generally V-shape, having two legs with free edges, and being formed with an annular flange adapted to be interposed between the end of the spigot and the bottom of the bell, one of said legs extending axially and constructed to snugly embrace the end of the spigot, and the other leg being disposed at an angle to the first, and normally flaring outwardly therefrom, said outwardly flaring leg having a maximum diameter substantially greater than the diameter of the inner surface of the bell, and being adapted to engage and lie in close contact with the wall of the bell when inserted therein and to be thereby deformed, and forced inwardly into a position approximately parallel with but spaced a substantial distance from said first leg, and one leg having at its free edge an annular, elastic, compressible member lying at an acute angle thereto and projecting toward the other leg, said member being unattached to but constructed to abut and be compressed directly against the cylindrical surface of said other leg when said outwardly flaring leg is forced inwardly by engagement with the wall of the bell.

WARREN C. PERROW.

REFERENCES CITED

The following references are of record in the file of this patent:

UNITED STATES PATENTS

| Number | Name | Date |
|---|---|---|
| 126,624 | Coffee | May 14, 1872 |
| 1,083,350 | Davis | Jan. 6, 1914 |
| 1,947,881 | Schutz | Feb. 20, 1934 |
| 2,219,289 | Bennett | Oct. 29, 1940 |
| 2,230,725 | Nathan | Feb. 4, 1941 |
| 2,274,323 | Fisher | Feb. 24, 1942 |
| 2,280,183 | Bennett | Apr. 21, 1942 |
| 2,314,386 | Brend | Mar. 23, 1943 |
| 2,372,095 | Leistensnider | Mar. 20, 1945 |

FOREIGN PATENTS

| Number | Country | Date |
|---|---|---|
| 392,932 | Germany | Mar. 27, 1924 |